US012621396B2

(12) United States Patent
Kharbush et al.

(10) Patent No.: US 12,621,396 B2
(45) Date of Patent: May 5, 2026

(54) PHOTO-BASED WORKFLOW INITIATION

(71) Applicant: BillGo, Inc., Fort Collins, CO (US)

(72) Inventors: Alex Kharbush, Fort Collins, CO (US);
Bradley Irvin, Fort Collins, CO (US);
Sean Tan, Fort Collins, CO (US)

(73) Assignee: BillGo, Inc., Fort Collins, CO (US)

( * ) Notice: Subject to any disclaimer, the term of this
patent is extended or adjusted under 35
U.S.C. 154(b) by 0 days.

(21) Appl. No.: 18/505,705

(22) Filed: Nov. 9, 2023

(65) Prior Publication Data

US 2024/0155064 A1     May 9, 2024

Related U.S. Application Data

(60) Provisional application No. 63/383,009, filed on Nov.
9, 2022.

(51) Int. Cl.
| | |
|---|---|
| *H04N 1/00* | (2006.01) |
| *G06V 10/82* | (2022.01) |
| *G06V 30/148* | (2022.01) |
| *G06V 30/19* | (2022.01) |
| *G06V 30/412* | (2022.01) |
| *G06Q 30/04* | (2012.01) |

(52) U.S. Cl.
CPC ......... *H04N 1/00816* (2013.01); *G06V 10/82*
(2022.01); *G06V 30/148* (2022.01); *G06V
30/1908* (2022.01); *G06V 30/412* (2022.01);
*H04N 1/00251* (2013.01); *G06Q 30/04*
(2013.01)

(58) Field of Classification Search
None
See application file for complete search history.

(56) References Cited

U.S. PATENT DOCUMENTS

| | | | |
|---|---|---|---|
| 2016/0358140 A1* | 12/2016 | Pigg ................... | G06Q 20/1085 |
| 2021/0312222 A1* | 10/2021 | Simpson ............ | G06F 18/2413 |
| 2022/0351534 A1* | 11/2022 | Miller ................. | G06Q 10/083 |
| 2023/0419018 A1* | 12/2023 | Overlund .............. | G06V 30/41 |
| 2024/0193979 A1* | 6/2024 | Zeise ................... | G06V 30/414 |

* cited by examiner

*Primary Examiner* — Andrew H Lam

(57) ABSTRACT

Systems and methods are provided for generating a resource
transmission request to initiate a workflow associated with
resource transmission. In particular, the disclosed technol-
ogy is directed to processing image data corresponding to a
physical notice of a request for resource transmission to
generate an electronic resource transmission request. The
system captures image data of the notice and extracts data
from the image data. As an example, the system matches the
extracted data against predetermined forms and determines
whether the notice is in a known format. In instances where
there is no match (such that the notice has an unknown
format), the system uses one or more of heatmaps, rules of
locating field data, and/or a field data extraction model to
assign respective field names with data values in the
extracted data. The heatmap includes regions in the image
data with a likelihood of data values corresponding to
particular field names.

20 Claims, 8 Drawing Sheets

300

Field Data (Image Size: 1800 x 2400)

| Field Name 302 | Horizonal Position 304 | Vertical Position 306 | Width 308 | Height 310 |
|---|---|---|---|---|
| Sender Account # | 1200 | 1600 | 200 | 100 |
| Sender Name | 200 | 1900 | 200 | 100 |
| Sender Address | 200 | 2000 | 200 | 200 |
| Receiver Name | 900 | 1900 | 200 | 100 |
| Receiver Address | 900 | 2000 | 200 | 200 |
| Amount | 1400 | 1500 | 200 | 50 |

Retrieve Heatmap 202

Match Region-of-Interest 204

Assign Field Data 206

Generate Request for Transmitting Resources 208

300

Field Data (Image Size: 1800 x 2400)

| Field Name 302 | Horizonal Position 304 | Vertical Position 306 | Width 308 | Height 310 |
|---|---|---|---|---|
| Sender Account # | 1200 | 1600 | 200 | 100 |
| Sender Name | 200 | 1900 | 200 | 100 |
| Sender Address | 200 | 2000 | 200 | 200 |
| Receiver Name | 900 | 1900 | 200 | 100 |
| Receiver Address | 900 | 2000 | 200 | 200 |
| Amount | 1400 | 1500 | 200 | 50 |

Predicted Field Data (Heatmap Data)

| Field Name 402 | Horizonal Position 404 | Vertical Position 406 | Width 408 | Height 410 | Data Value 412 | Probability 414 |
|---|---|---|---|---|---|---|
| Sender Account # | 1200 | 1600 | 200 | 100 | 12345678 | 99 |
| Sender Name | 200 | 1900 | 200 | 100 | Iam Customer | 99 |
| Sender Address | 200 | 2000 | 200 | 200 | 123 Main... | 100 |
| Receiver Name | 400 | 500 | 500 | 200 | Company-A | 88 |
| Receiver Address | 400 | 2000 | 500 | 200 | P.O.Box 12345 | 95 |
| Amount | 1200 | 200 | 200 | 30 | 100 | 85 |

652 — START

654 — Receive image data in a known format as training data

656 — Receive regions of interest data (X, Y, W, H, Text Data) and corresponding field name as training data 658 — Retrieve receiver information as training data from a receiver information database 660 — Train Field Data Extraction Model

662 — END

PHOTO-BASED WORKFLOW INITIATION

CROSS-REFERENCE TO RELATED APPLICATION

This application claims priority to U.S. Provisional Application No. 63/383,009, titled "Photo-Based Workflow Initiation," filed on Nov. 9, 2022, the entire disclosure of which is hereby incorporated by reference in its entirety.

BACKGROUND

Using online systems for processing resource transmission has become a common place in our daily lives. However, such online systems typically have a high degree of variability, which may make it difficult for a user to manually enter information associated with a resource transmission request. These and other difficulties may result in a poor user experience, introduce the potential for human error, and may even causes resources to be transmitted incorrectly.

It is with respect to these and other general considerations that the aspects disclosed herein have been made. Although relatively specific problems may be discussed, it should be understood that the examples should not be limited to solving the specific problems identified in the background or elsewhere in this disclosure.

SUMMARY

Aspects of the present disclosure relate to receiving image data as input to initiate a workflow. In particular, the workflow relates to tasks including transmission of resources based on a request for resource transmission. The image data may be in a form that is predetermined by a system (e.g., a predefined format) or unknown by the system (e.g., an unknown format). An embodiment captures a notice of a request for resource transmission in a physical form (e.g., a paper form) and generates image data (e.g., photo data). The disclosed technology transforms the image data into a set of fields and data values and generates a request for resource transmission for initiating the workflow.

The system identifies whether the extracted data corresponds to a determined form of a notice. The process of identifying includes matching the extracted data and location information of the respective extracted data in the image data against the predetermined forms. A predetermined form includes a field name and location information of a region of interest where a data value associated with the field name appears in the form. Given the identified form, the system assigns data values to respective field names.

When the extracted data does not correspond to a predetermined form, the system uses a set of heatmaps associated with the notice to determine a set of field names and associated data values from the extracted data. The set of heatmaps includes one or more heatmaps corresponding to respective field names. For example, a heatmap indicates one or more regions of interest in the image data with probability values. The probability values may indicate a likelihood that a data value associated with a field name appears (e.g., is printed or is otherwise stored) in the respective one or more regions of interest. The set of heatmaps is generated based on statistic data associated with locations of various fields at which data is placed in sample notices (e.g., of a request for resource transmission) having varying formats. The system assigns data values to respective field names using data values in a region that matches with a region of interest with the highest probability value in the respective heatmaps. The process of identifying further includes a use of one or more rules associated with placement of data associated with respective field names.

Additionally, or alternatively, the system uses a field data extraction model to determine data values for respective field names to generate a request for resource transmission. The field data extraction model includes a neural network and is trained according to a representative set of training data. The model is used to process image data comprising a notice of a request for resource transmission as an input. Given the input, the model predicts data value assignments to respective field names at various locations within the image data. Training data used for training the model may include sample image data of notices of a request for resource transmission in various formats. The training data may further include a set of pairs of a field name and a data value as ground truth data, which matches with content of the image data.

Accordingly, the system generates a request for resource transmission in an electronic form based on information that is extracted from image data according to aspects described herein, thereby reducing the potential for human error, expediting resource transmission processing, and improving an associated user experience, among other benefits. The generated request for resource transmission may thus initiate a workflow for processing the request for resource transmission accordingly.

This Summary introduces a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 3 illustrates an example of field data associated with resource transmission in accordance with aspects of the present disclosure.

FIG. 4 illustrates examples of predicted field data in accordance with aspects of the present disclosure.

DETAILED DESCRIPTION

Figure 1:
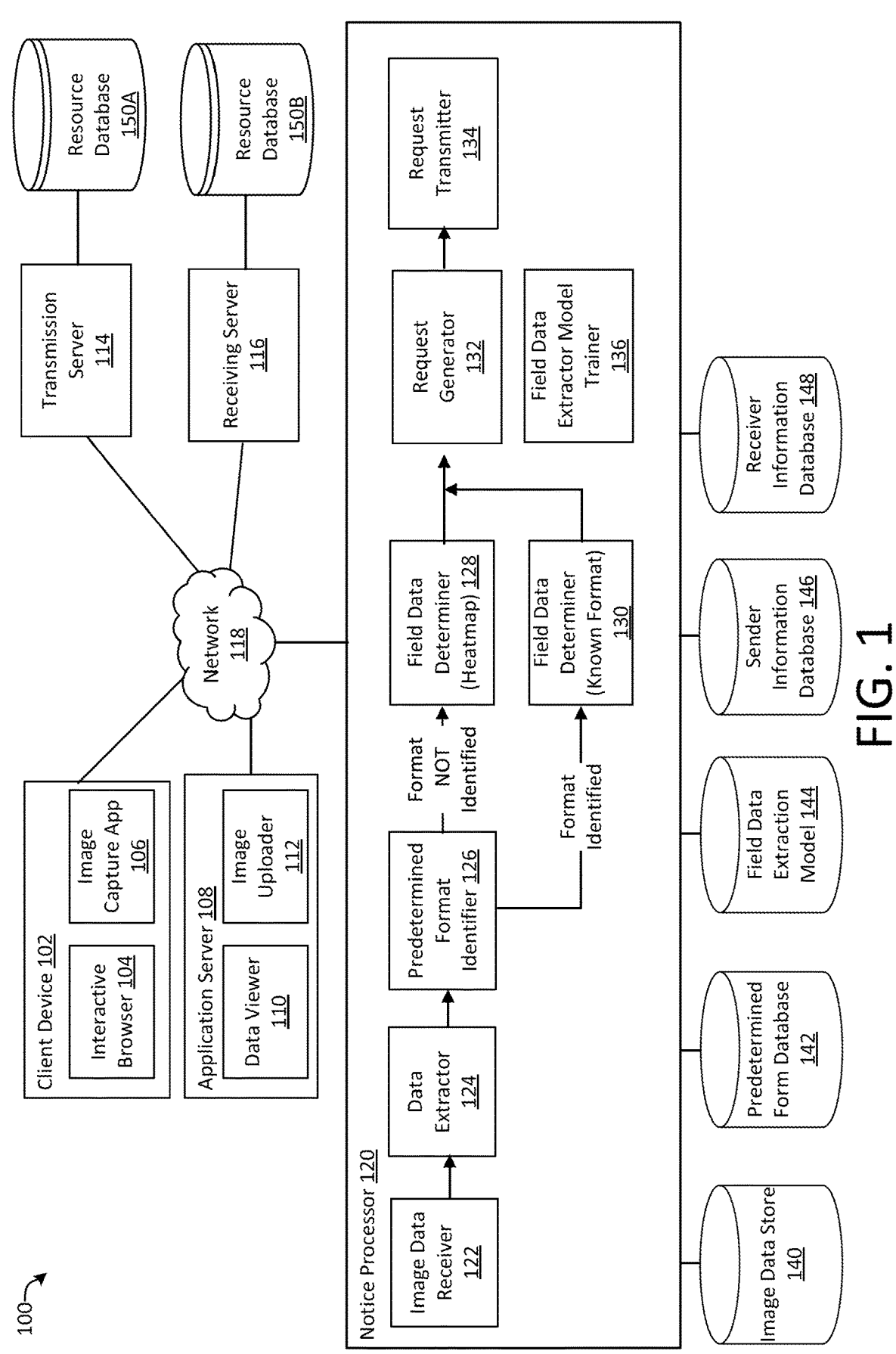
FIG. 1 illustrates an overview of an example system for image-based workflow initiation in accordance with aspects of the present disclosure.

Various aspects of the disclosure are described more fully below with reference to the accompanying drawings, which form a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

Online resource transmission has become popular among users for transacting electronically because of its convenience for a variety of purposes. Examples of online resource transmission include instances where a sender receives a request notice (e.g., a notice of a request for resource transmission, an invoice, a bill, and the like) to transmit one or more resources in an electronic form, such that the sender (e.g., a receiver of the request notice) completes a transmission request to transmit the requested resources according to the received request notice. The request notice for payment in an electronic form includes an email or other electronic messages containing a notice of request for resource transmission. Receiving the electronic request notice thus becomes an entry point for initiating a series of steps as a workflow to complete transmission of the requested resources.

While an increasing number of request notices for transmitting resources are in an electronic form (e.g., email content), request notices in a physical form (e.g., an invoice and a bill in a paper form) continues to be prevalent. An issue arises when a user receives a transmission request notice in a physical form and attempts to initiate a workflow for online resource transmission. In traditional systems, the user needs to manually read the transmission request notice in a physical form and manually enter information needed for initiating the workflow for online resource transmission. Such a manual task of entering the information printed on the transmission request notice in a physical form is inefficient and less accurate than processing the notice in an electronic form because of human errors that frequently occur in reading and/or typing information. Additionally, variability across transmission request notices may mean that the user is unfamiliar with the associated online workflow, thereby increasing the potential for human error (e.g., providing incorrect information for a given field or navigating to the wrong workflow and providing information to an unrelated third party).

Some systems may use forms with a predefined format to ensure accuracy of extracted data. For example, machine-readable sheets (e.g., an order sheet, a check, and the like) may be available to a requestor of resource transmission to fill in values of resources in handwriting. Such predefined machine-readable sheets enable the requestor select one or more options from a list of options by filling in boxes and circles in designated areas on the sheet.

However, use of a predefined format is not practical for request notices for resource transmission (e.g., bills and invoices), because nothing restricts a format of the request notices to various issuers of the request notices. For example, distinct systems may generate invoices and/or bills in distinct styles (e.g., such that field data values are located in distinct places). As an example, some notices may include a requested resource amount at the top of the notices, while other notices may include the amount at the center or the bottom of the notices. Yet some other notices place a user or sender (e.g., a customer or payer) address to the left side of the notices while placing a recipient (e.g., a business or payee) address on the right side of the notices. Still yet some other notices may print in a reverse manner. It is often difficult to determine which fields the extracted information corresponds to (e.g., whether an address extracted from a request notice is that of a user/sender or that of a recipient). Thus, it is difficult to extract information needed from request notices for successfully initiating and completing an online workflow for processing resource transmission.

Additionally, there have been various issues associated with using physical notices for online workflows. Example issues include verifying the authenticity of the notices. Unlike other physical media associated with electronic resource transmission (e.g., a check with various security features to indicate authenticity), a physical notice may lack such security features.

Another type of the issue involves correctly extracting field data from a physical notice. Extracting field data not only includes correctly recognizing textual data but also accurately interpreting types of field data (thus matching the extracted text to various fields). Example types of field data include, but are not limited to, names and contact information associated with a sender and a recipient, an amount of resources requested, a workflow due date, a user identifier (e.g., an alias or an account number), and the like. Fonts and the size of characters printed on the physical notices may also vary. Thus, the complexity of the issue becomes substantial, as there are a countless number of formats being used for physical notices.

Accordingly, there has been a need for a technical solution for the technical problem of efficiently and accurately transforming information on a physical transmission request notice into electronic data efficiently and accurately such that it is usable to initiate a workflow for online resource transmission.

The present disclosure addresses these and other issues by automatically generating data for a resource transmission workflow based on a physical notice (e.g., a resource transmission request form). In examples, data is extracted from a physical notice that is in a known format using a set of predefined formats. The disclosed technology further automatically generates data associated with a resource transmission request when a format of a physical notice is unknown to the system by recognizing field data and extracting information from the physical notice accordingly. As an example, the system uses a set of heatmaps for determining a likely format of the physical notice and automatically extracting field data according to a heatmap. The disclosed technology, in examples, includes a field data extractor model, which is trained to predict a format of a resource transmission request for accurately extracting field data.

Various embodiments in the present disclosure thus enable the use of a notice of a request for resource transmission a physical form to initiate an online resource transmission workflow. In aspects, the disclosure technology addresses the above-detailed issues by using a set of predetermined formats to identify a resource transmission request in formats that are predetermined. The embodiments as described herein may further use heatmap data to determine a likelihood of specific field data indicated in particular locations of a resource transmission request in a physical form to accurately extract data for initiating a workflow for online resource transmission. While examples are described with respect to image data corresponding to a physical notice, it will be appreciated that similar techniques may be used for a screenshot of an electronic notice (e.g., an email, a website, or a text message) in other examples.

FIG. 1 illustrates an overview of an example system for image-based workflow initiation in accordance with aspects of the present disclosure. A system 100 may include client device 102, application server 108, transmission server 114, receiving server 116, network 118, and notice processor 120. The network 118 connects parts of the system 100 including the client device 102, the application server 108, the transmission server 114, the receiving server 116, and the notice processor 120.

The client device 102 includes a computing device that is interactively operated by a user. The client device 102 receives scanned image (e.g., a photo) data of a notice of a request for resource transmission in a physical form. The client device 102 includes interactive browser 104 and image capture application 106. The image capture application 106 captures an image of the notice of a request for resource transmission in a paper form and outputs the captured data as image data (e.g., for uploading to the application server 108). The interactive browser 104 provides graphical user interface for the user of the client device 102 to interactively operate for operating steps associated with online resource transmission based on the captured image data from image capture application 106.

The application server 108 includes data viewer 110 and image uploader 112. The data viewer 110 renders image data of the resource transmission request for display on the interactive browser 104 of the client device 102. The image uploader 112 receives image data from the client device 102 and transmits the uploaded image data to the notice processor 120 for further processing of the resource transmission request. While the system 100 is illustrated as an example in which interactive browser 104 is used to access a website provided by application server 108, it will be appreciated that, in other examples, similar aspects may be implemented as a mobile application.

The transmission server 114 transmits resources to the receiving server 116 according to a resource transmission request (e.g., as may be initiated via interactive browser 104 based on captured image data according to aspects described herein). In examples, the resources include, but are not limited to, one or more files, access to one or more computing resources, one or more physical objects, and/or financial instruments (e.g., money, such that the resources transmission may include the remittance of money). In other examples, the resources correspond to a count of items in an inventory. The transmission server 114 includes resource database 150A. The resource database 150A stores resources and/or records corresponding to resources, among other examples. Upon transmitting a resource, the transmission server 114 retrieves the resource as requested and transmits the resource to the receiving server 116 according to the resource transmission request.

The receiving server 116 receives a transmission of resources from the transmission server 114. The receiving server 116 includes resource database 150B. The resource database 150B stores resources that the receiving server 116 has received from the transmission server 114. After receiving a resource from the transmission server 114, the receiving server 116 stores the resource in the resource database 150B.

In aspects, resources stored in the resource database 150A correspond to one or more users who own the resources.

Among the one or more users may be the user (e.g., the sender) who operates the client device 102 and instructs the system 100 to transmit a resource stored in the resource database 150A to another user (e.g., the recipient of the resource) whose resources are stored in the resource database 150B of the receiving server 116.

The notice processor 120 generates a resource transmission request for execution from a resource transmission request notice received as image data. In examples, the notice processor 120 receives image data representing a resource transmission request notice in a physical (e.g., paper) form (e.g., as may have been captured by image capture application 106). The notice processor 120 determines field data for generating a request for electronically transmitting a resource from the transmission server 114 to the receiving server 116. In other examples, at least a part of the notice processing performed by notice processor 120 may be performed by client device 102 and/or by any of a variety of other computing devices. For example, client device 102 may extract data from a captured image, such that the extracted data is provided to notice processor 120 for subsequent resource transmission processing.

The notice processor 120 includes image data receiver 122, data extractor 124, predetermined format identifier 126, field data determiner (heatmap) 128, field data determiner (known format) 130, request generator 132, request transmitter 134, and field data extractor model trainer 136. The notice processor 120 connects with various data stores and databases including image data store 140, predetermined form database 142, field data extraction model 144, sender information database 146, and receiver information database 148.

The image data receiver 122 receives image data including a captured image data of a resource transmission request notice in a paper form. The image data receiver 122 receives the data from the image uploader 112 of the application server 108. In aspects, a user who operates the client device 102 captures an image of the physical resource transmission request using the image capture application 106. The image uploader 112 processes the uploading of the captured image data from the image capture application 106 of the client device 102. The image data receiver 122 receives the captured image data in the notice processor 120 and stores the captured image data in the image data store 140.

The data extractor 124 retrieves image data from the image data store 140 and extracts data values associated with textual data from the image data. The data extractor 124 uses one or more optical character recognition technologies for extracting the data values (e.g., through pixel-based or image data-based processing). The data extractor 124 outputs a set of extracted data. Each piece of extracted data may form a pair of data including a data value extracted from the image data and location information indicating where the data value was located within the image data. The location information may specify a location and a size of field data in two-dimensional (X-Y) coordinates corresponding to the physical resource transmission request. The data extractor 124 may further determine a data type of textual data based on recognized characters.

The predetermined format identifier 126 identifies a format of a resource transmission request notice by comparing the set of extracted data against one or more predetermined forms. The predetermined format identifier 126 retrieves predetermined form data from the predetermined form database 142. The predetermined form data includes a set of field data including locations of the respective instances of field data for resource transmission request forms in known formats.

Examples of field data include, but are not limited to, one or more of a name of a sender of a resource, contact information (e.g., an address and a phone number) associated with the sender, a name of a receiver of the resource, contact information (e.g., an address, a phone number, an account information) associated with the receiver, an amount of resource for transmission from the sender to the receiver, or the like.

Given an identified format of a resource transmission request notice, the field data determiner (known format) 130 determines and assigns values to respective field data associated with the resource transmission request notice. In aspects, the field data determiner (known format) 130 may assign data values that have been predetermined and stored as a part of the predetermined form as default values. In aspects, one or more data values that are stored in the predetermined form may supplement assigning values to the field data associated with the resource transmission request notice. The field data determiner (known format 130) outputs a set of field data and corresponding data values.

When the predetermined format identifier 126 fails to identify any predetermined form for the resource transmission request notice, the field data determiner (heatmap) 128 identifies a heatmap data from a set of heatmap data. The heatmap includes a likelihood of various field data appearing in different types of forms for resource transmission request notices.

A set of heatmaps may be predetermined based on types and locations of field data that appear in the resource transmission request notice. In aspects, a heatmap includes a list of types of field data and one or more regions of a notice where a likelihood of a type of field data appearing is at least above a predetermined threshold. For example, a heatmap may indicate that field data that represents a number of resources for transmission has a likelihood of being located in a region that is about two inches from the top toward the right edge of the resource transmission form or, similarly, that a field of data corresponding to a sender address is located a similar distance from the top of the notice but toward the left edge of the resource transmission form.

A heatmap used by field data determiner (heatmap) 128 may be generated based on statistical data associated with locations for field data of one or more resource transmission notices. As detailed below, the heatmap may be a part of the field data extraction model 144. The field data extraction model 144 may be trained using sample resource transmission request notices as training data, in a supervised manner and/or an unsupervised manner. The field data determiner (known format 130) outputs a set of field data and corresponding data values.

The request generator 132 generates a request for transmitting resources from the transmission server 114 to the receiving server 116 based on the set of field data and corresponding data values that was extracted according to aspects described herein (e.g., by field data determiner (heatmap) 128 or field data determiner (known format) 130). The request generator 132 retrieves sender information from sender information database 146 based on name and contact information associated with the sender in the field data. Similarly, the request generator 132 further retrieves receiver information from receiver information database 148 based on name and contact information associated with the recipient in the field data. The request for transmitting resources may be generated based on the extract field data accordingly. In aspects, the request generator 132 may correct one or more data values in field data with data retrieved from the sender information database 146 and the receiver information database 148.

The request transmitter 134 transmits the request for transmitting resources over the network 118 to the transmission server 114 for executing the request for resource transmission. Upon receiving the request, the transmission server 114 executes a transmission of resources as specified by the request. Accordingly, the receiving server 116 receives the resources from the transmission server. For example, the transmission server 114 transmits monetary resources based on an invoice that was processed to extract the relevant information associated with resource transmission (e.g., a user account, a sender name, a sender address, a recipient name, and/or a recipient address) according to the disclosed aspects.

In aspects, the field data extractor model trainer 136 trains a field data extraction model 144 using training data. A field extraction model, after being trained, predicts data values for respective field names based on image data of a notice of resource transmission. The field extraction model may include a neural network with one or more layers with coefficients determined through training. Training data includes, but is not limited to, sample image data of notices and field data as ground truth data associated with the respective image data. The field data may include information of a region of interest, as well as a field name and a data value assigned to the field name. A region of interest may correspond to a region in the image data where a data value for a field name appears (e.g., where the data value is printed or otherwise stored). Accordingly, the field data extractor model is trained to accurately determine field data based on locations of data values extracted from the image data.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2:
FIG. 2 illustrates an example method for extracting field data in accordance with aspects of the present disclosure.
Figure 2:
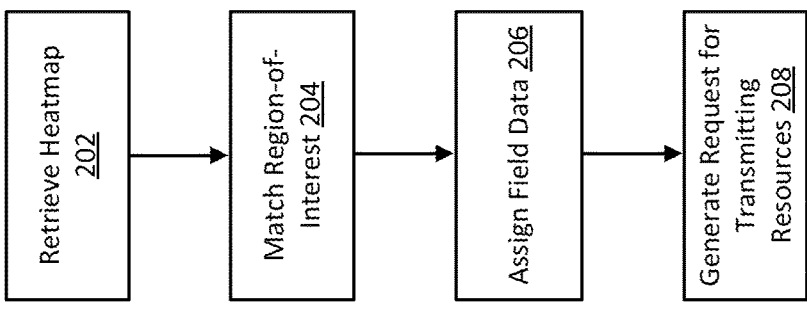

FIG. 2 illustrates an example method 200 for extracting field data in accordance with aspects of the present disclosure. A general order of the operations for the method 200 is shown in FIG. 2. Generally, the method 200 begins with retrieve operation 202 and ends with generate operation 208. The method 200 may include more or fewer steps or may arrange the order of the steps differently than those shown in FIG. 200. The method 200 can be executed as a set of computer-executable instructions executed by a cloud system and encoded or stored on a computer readable medium. Further, the method 200 can be performed by gates or circuits associated with a processor, an ASIC, an FPGA, a SOC or other hardware device. Hereinafter, the method 200 shall be explained with reference to the systems, components, devices, modules, software, data structures, data characteristic representations, signaling diagrams, methods, etc., described in conjunction with FIGS. 1, 3, 4A-B, 5A-D, 6B, and 7.

The method 200 begins with retrieve operation 202, in which heatmap data is retrieved from a field data extraction model. The field data extraction model includes one or more predetermined heatmaps associated with various types of resource transmission request notices. Examples of resource transmission request notices include, but are not limited to, invoices, bills, payment requests, and the like. A heatmap includes a list of regions of interest and probability values of types of field data associated with respective regions of interest.

At match operation 204, the respective regions of interest in a heatmap are matched against a set of extracted data from the image data. Each piece of extracted data includes a position and a size of a region and a value of the extracted data. The match operation 204 matches a piece of extracted data with a region of interest in the heatmap. The match operation 204 iteratively matches pieces of extracted data with regions of interest in the heatmap.

In aspects, each region of interest in the heatmap corresponds to a name of field data (e.g., a field name) and a probability value that the region of interest corresponds to the field name. For example, a region of interest in the heatmap may correspond to a sender name at 80%. The match operation 204 determines field names for each piece of extracted data based on the heatmap and a probability value. When more than one region of interest in the heatmap indicate distinct field names with distinct probability values, the match operation 204 may match a region of interest with a higher probability value to determine a matching field name to the piece of extracted data.

At assign operation 206, respective data values of the set of extracted data are assigned with field names. In aspects, the assign operation 206 assigns each data value with a field name that is distinct from others. Each field name corresponds to a data value from a distinct piece of extracted data. In aspects, the assign operation 206 may raise an exception when one or more field names needed for generating a request for resource transmission is not assignable based on the set of extracted data and the heatmap. Additionally, or alternatively, the assign operation 206 may provide an interactive user interface (e.g., via interactive browser 104 of client device 102 in FIG. 1) to interactively receive data values for missing field data from the user through the user interface.

At generate operation 208, a request for transmitting resources is generated. The generation operation 208 generates the request based on the assigned field data. The request may include the data values associated with fields needed to perform a transmission of resources.

As should be appreciated, operations 202-208 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 3 illustrates an example of field data 300 associated with resource transmission in accordance with aspects of the present disclosure. The example field data 300 indicates a predetermined format associated with a resource transmission request notice in image data. Each entry of field data includes field name 302 and location information of a region of interest where a data value for a field may be identified, as illustrated, the location information includes horizontal position 304, vertical position 306, width 308, and height 310 of the region in the image data.

A unit of the numerical values may be a distance (e.g., millimeters) or a number of pixels in the image data, among other examples. In the example field data 300, the numerical values represent pixels and an image size is horizontally in 1800 pixels and vertically in 2400 pixels. In the illustrated example, a sender account number is located at a region as specified by a horizontal position of 1200, a vertical position of 1600, a width of 200, and a height of 100. Similarly, a sender name is located at a region as specified by a horizontal position of 200, a vertical position of 1900, a width of 200, and a height of 100. A sender address is located at a region as specified by a horizontal position of 200, a vertical position of 2000, a width of 200, and a height of 200. A receiver name is located at a region as specified by a horizontal position of 900, a vertical position of 1900, a width of 200, and a height of 100. A receiver address is located at a region as specified by a horizontal position of 900, a vertical position of 2000, a width of 200, and a height of 200. An amount for resource for transmission is located at a region as specified by a horizontal position of 1400, a vertical position of 1500, a width of 200, and a height of 50.

In examples, the location information is used to perform fuzzy matching and/or other types of proximity matching, such that text that is identified within a certain distance from the indicated location may be evaluated for inclusion in extracted field data. Additionally, the location information may be with respect to a corner of a notice identified within the image data, such that a location of the corner (or other landmark) may be determined within the image data, after which the location information is used to extract field data accordingly.

As will be appreciated, the various methods, devices, applications, features, etc., described with respect to FIG. 3 is not intended to limit use of the example field data 300. Accordingly, additional and/or alternative processes and configurations may be used to practice the methods and systems herein and/or features and applications described may be excluded without departing from the methods and systems disclosed herein.

FIG. 4 illustrates an example of predicted field data in accordance with aspects of the present disclosure. Example predicted field data 400 represents data associated with a heatmap for determining field data from a set of extracted data from image data. In aspects, a heatmap includes one or more field names and corresponding regions of interest in image data, and a probability value that indicates a likelihood of a region of interest including data for a field name. The predicted field data 400 includes field name 402, horizontal position 404, vertical position 406, width 408, height 410, data value 412 and a probability value 414. The horizontal position 404, the vertical position, the width 408, and the height 410 indicate a region of interest that correspond to a field name in image data. The field name 402 corresponds to a name of field data associated with a resource transmission request. The data value 412 indicates a data value that has been extracted from the image data according to aspects described herein.

For example, a sender account number corresponds to a region of interest as specified by horizontal position at 1200, vertical position at 1600, width of 200 and height of 100. A data value "12345678" is assigned to the sender account number at a probability value (e.g., a confidence value) of 99 out of 100 (e.g., a substantially high level of confidence associated with the assignment). Similarly, a sender name corresponds to a region of interest as specified by horizontal position at 200, vertical position at 1900, width of 200 and height of 100. A data value "I am Customer" is assigned to the sender's name at a probability value (e.g., a confidence value) of 99 out of 100. A sender address corresponds to a region of interest as specified by horizontal position at 200, vertical position at 2000, width of 200 and height of 200. A data value "123 Main Street . . . " is assigned to the sender address at a probability value (e.g., a confidence value) of 99 out of 100.

In further examples, a receiver name corresponds to a region of interest as specified by horizontal position at 400, vertical position at 500, width of 500 and height of 200. A data value "Company-A" is assigned to the receiver's name at a probability value (e.g., a confidence value) of 88 out of 100. A receiver address corresponds to a region of interest as specified by horizontal position at 400, vertical position at 2000, width of 400 and height of 200. A data value "P.O. Box 12345 . . . " is assigned to the receiver address at a probability value of 95. An amount of resources for transmission (e.g., an amount of payment for a bill) corresponds to a region of interest as specified by horizontal position at 1200, vertical position at 200, width of 200, and height of 30. A data value "100" is assigned to the amount at a probability value of 85.

As will be appreciated, the various methods, devices, applications, features, etc., described with respect to FIG. 4 are not intended to be limited to use of the predicted field data 400. Accordingly, additional data structures or configurations may be used to practice the methods and systems herein and/or features and applications described may be excluded without departing from the methods and systems disclosed herein.

Figures 5A, 5B, 5C, 5D:
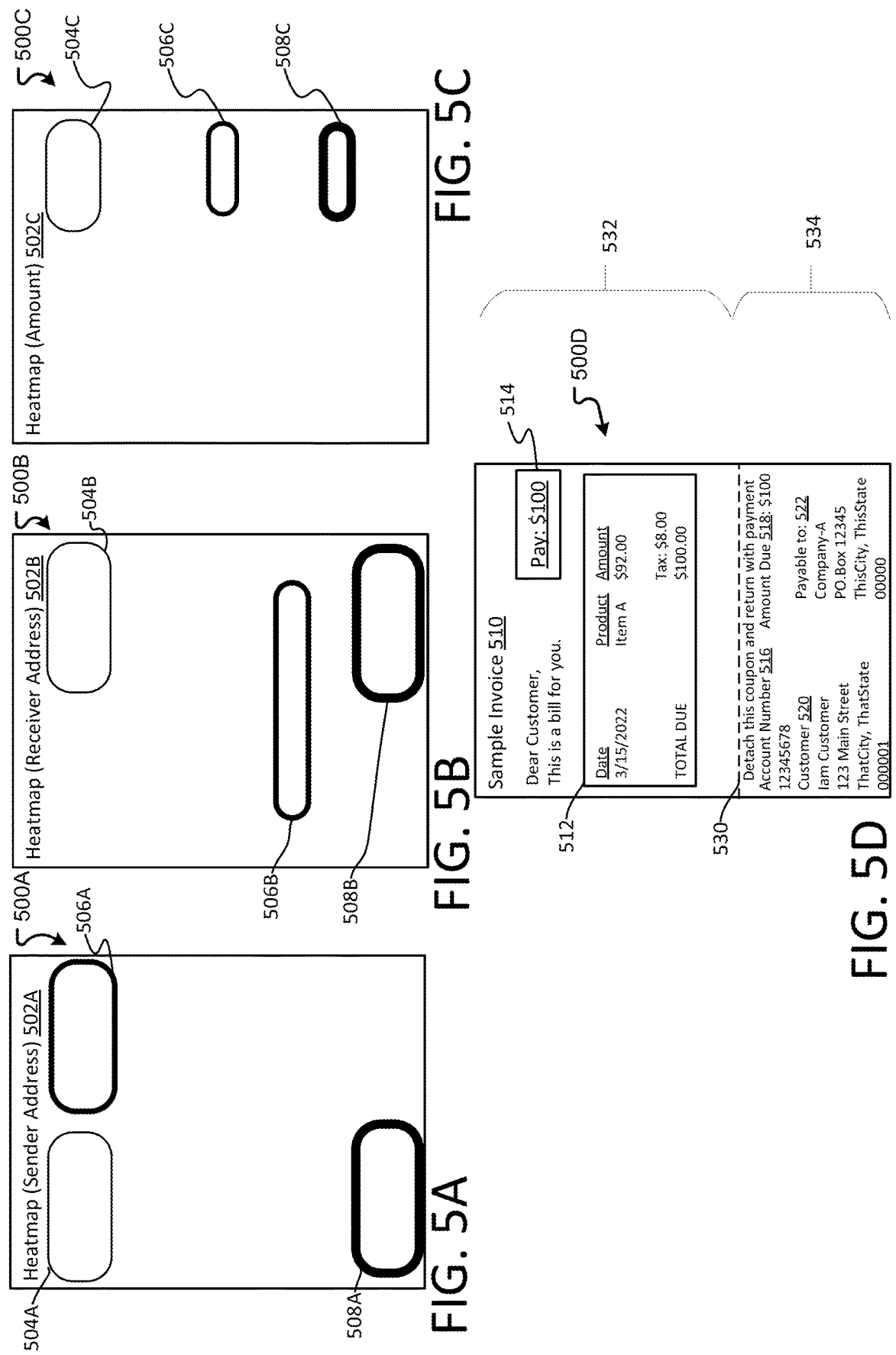
FIGS. 5A-5C illustrate examples of heatmaps associated with field names in accordance with aspects of the present disclosure.
FIG. 5D illustrates an example of a notice of a request for resource transmission in accordance with aspects of the present disclosure.

FIGS. 5A-5C illustrate examples of heatmaps associated field names in accordance with aspects of the present disclosure. FIG. 5A illustrates an example graphical representation 500A of a heatmap 502A associated with a sender address in a resource transmission request notice. The graphical representation 500A of a heatmap 502A in examples has a rectangular shape and includes indications of one or more regions of interest with boundary lines in distinct thickness. The rectangular shape corresponds to a shape of image data for a resource transmission request notice. In aspects, thinner the boundary line is lower the probability value is for including a data value for a field name within the region of interest. For example, a boundary with the thinnest boundary line indicates a probability value of more than 50% and less than 85%. A boundary with the boundary line in a medium thickness indicates a probability value of at least 85% and less than 97%. A boundary with the thickest boundary line indicates a probability value of at least 97%. The boundary of the probability values is not limited to the example and may be configurable.

For example, the heatmap (sender address) 502A indicates a heatmap associated with a field name of a sender address. The heatmap (sender address) 502A includes a first region 504A with a thinnest boundary line at toward the upper left corner of the heatmap (sender address) 502A. A second region 506A has a boundary in medium thickness. A third region 508A has the thickest boundary line. Accordingly, the heatmap (sender address) 502A indicates the highest probability of including a value for a sender address in the third region 508A, followed by the second region 506A and then the first region 504A.

FIG. 5B illustrates an example graphical representation 500B of a heatmap 502B associated with a receiver address in a resource transmission request notice. The heatmap (receiver address) 502B includes a first region 504B with a thinnest boundary line at toward the upper right corner of the heatmap (receiver address) 502B. A second region 506B in the middle section of the notice has a boundary in medium thickness. A third region 508B toward the lower right corner of the notice has the thickest boundary line. Accordingly, the heatmap (receiver address) 502B indicates the highest probability of including a value for a receiver address in the third region 508B, followed by the second region 506B and then the first region 504B.

FIG. 5C illustrates an example graphical representation 500C of a heatmap 502C associated with an amount of resources for transmission (e.g., an amount of money invoiced) in a resource transmission request notice. The heatmap (amount) 502C includes a first region 504C with a thinnest boundary line at toward the upper right corner of the heatmap (amount) 502B. A second region 506B toward the right side of the middle section of the notice has a boundary in medium thickness. A third region 508B toward the right side of the lower section of the notice has the thickest boundary line. Accordingly, the heatmap (amount) 502B indicates the highest probability of including a value for an amount of resources in the third region 508B, followed by the second region 506B and then the first region 504B.

FIG. 5D illustrates an example graphical representation of a notice 500D of a request for resource transmission in accordance with aspects of the present disclosure. The example notice 500D indicates a sample invoice 510, which includes various field data at particular positions. The sample invoice 510 includes a perforation 530 that separates a statement section 532 from a payment slip section 534. The statement section 532 includes an amount 514 invoiced for payment (e.g., "Pay: $100") and an itemized list 512 including date and product name, and a subtotal. The payment slip section 534 indicates account number 516 associated with the customer, customer information 520, and payee information 522 ("Payable to:"). The payment slip section 534 further includes an amount due 518. The customer information corresponds to a sender information for a resource transmission. The payee information corresponds to a receiver information for the resource transmission. In aspects, the sample invoice 510 may illustrate one of sample data used to generate the heatmap (sender address) 502A, the heatmap (receiver address) 502B, and the heatmap (amount) 502C.

As will be appreciated, the various methods, devices, applications, features, etc., described with respect to FIGS. 5A-D are not intended to be limited to use of the heatmaps 502A-502C or the notice of a request for resource transmission 500D. Accordingly, additional data structures or configurations may be used to practice the methods and systems herein and/or features and applications described may be excluded without departing from the methods and systems disclosed herein.

Figure 6A:
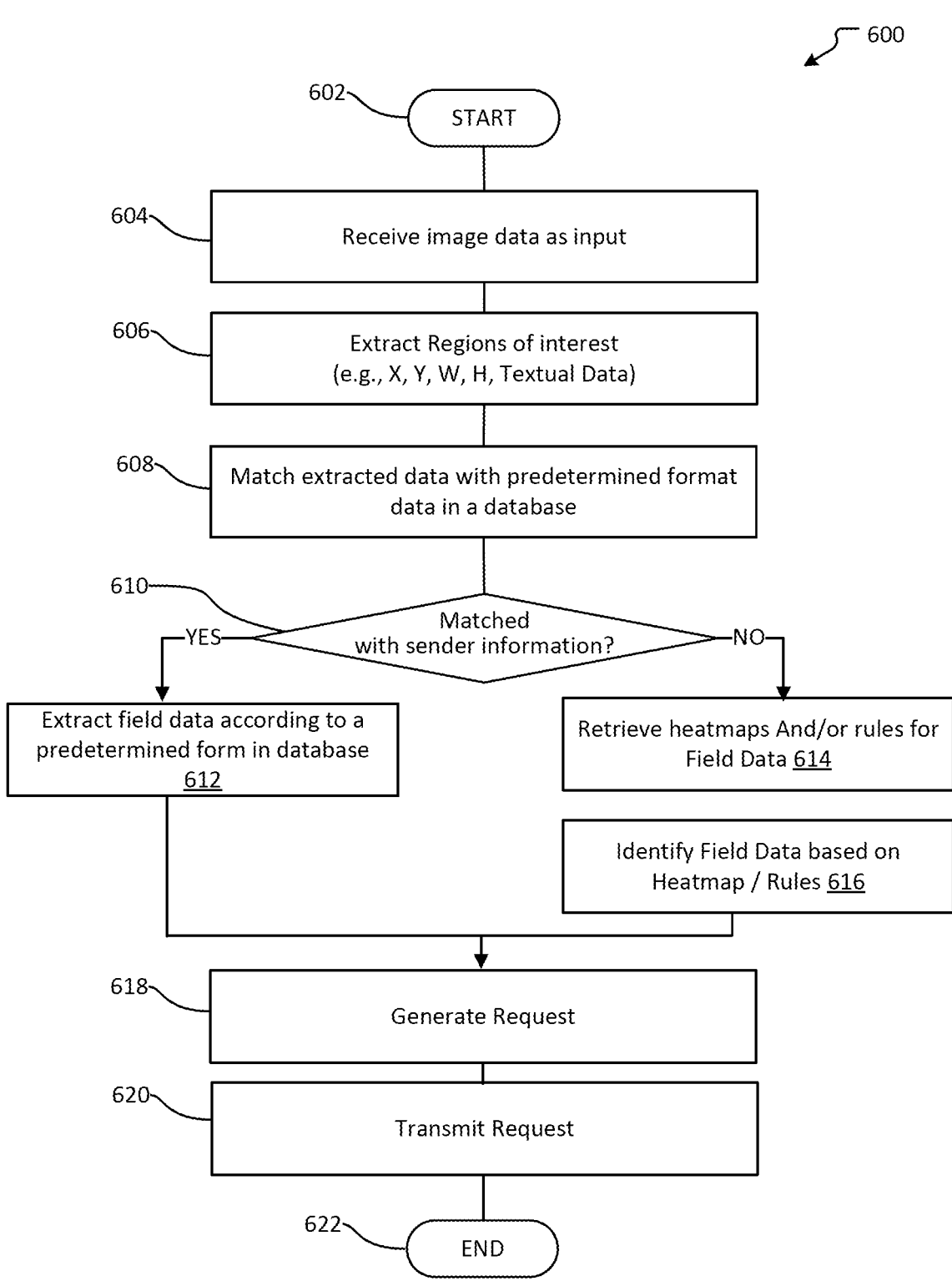
FIG. 6A illustrates an example method for generating a request for resource transmission based on image data in accordance with aspects of the present disclosure.

FIG. 6A illustrates an example method 600 for generating a request for resource transmission based on image data in accordance with aspects of the present disclosure. A general order of the operations for the example method 600 is shown in FIG. 6A. Generally, the method 600 begins with start operation 602 and end with end operation 622. The method 600 may include more or fewer steps or may arrange the order of the steps differently than those shown in FIG. 6A. The method 600 can be executed as a set of computer-executable instructions executed by a cloud system and encoded or stored on a computer readable medium. Further, the method 600 can be performed by gates or circuits associated with a processor, an ASIC, an FPGA, a SOC or other hardware device. Hereinafter, the method 600 shall be explained with reference to the systems, components, devices, modules, software, data structures, data characteristic representations, signaling diagrams, methods, etc., described in conjunction with FIGS. 1, 2, 3, 4, 5A-5D, 6B, and 7.

Following start operation 602, the method 600 begins with receive operation 604, which receives image input data. The image input data may be associated with scanned data of a resource transmission request notice in a physical form (e.g., an invoice or a bill in a paper form).

At extract operation 606, one or more regions of interest are extracted from the image data. An extracted region of interest may be expressed in a data structure including a horizontal position (X), a vertical position (Y), a width (W) and a height (H) in the image data. The one or more regions of interest include textual data.

At match operation 608, the position and the size of the region of interest is matched against a region of interest (e.g., sender information) in one of predetermined forms stored in a predetermined form database (e.g., the predetermined form database 142 as shown in FIG. 1). Based on the match between the extracted region of interest and a region of interest associated with a predetermined form, it is determined that the resource transmission request notice in the image data has a known format.

Determination operation 610 decides whether there is a match between the extracted region of interest and a region of interest in the predetermined form. It will be appreciated that any of a variety of additional or alternative techniques may be used to determine whether there is a match between the image data and a predetermined form. If there is a match, the operation proceeds to extract operation 612. The extract operation 612 extracts field data from the extracted region of interest according to a format according to by the predetermined form. For example, a form associated with sender information may specify that the region of interest for sender information includes a plurality of lines of text data, where, for example, the first line indicates a sender name, the second line indicates a street address of a sender address, the third line indicates a city and a state information, followed by a zip code, and the like. Method 600 then progresses to operation 618, which is discussed below.

Returning to determination operation 610, when there is not a match between the extracted region of interest and a region of interest in the predetermined form, the method instead proceeds to retrieve heatmap operation 614. At retrieve heatmap operation 614, one or more instances of heatmap data (e.g., the heatmap (sender address) 502A, the heatmap (receiver address) 502B, the heatmap (amount) 502C as respectively shown in FIGS. 5A, 5B, and 5C) are retrieved from a heatmap database and/or a field data extraction model.

In aspects, heatmaps for a notice of a request for resource transmission include a heatmap that corresponds to a field name. For example, there may be a heatmap associated with a sender name and another heatmap may be associated with a sender address (e.g., the heatmap (sender address) 502A as shown in FIG. 5A, the heatmap (receiver address) 502B as shown in FIG. 5B, the heatmap (amount) 502C as shown in FIG. 5C, and the like). In further aspects, the retrieve heatmap operation 614 retrieves a set of rules for identifying data values for respective field data. For example, a rule may indicate that a line of text representing a street address is immediately below a line of text for a sender name.

Examples of the rules further include an address that includes an apartment number corresponds to a sender address because a sender is usually located at a private or residential address (e.g., the address under the Customer 520 as shown in FIG. 5D) in a commercial invoice. Furthermore, an address that includes a P.O. Box may be determined to correspond to a receiver address, because the receiver in a commercial invoice is usually a corporate enterprise with P.O. Box in its address for sending a check for payment (e.g., the PO Box address in the Payable to 522 as shown in FIG. 5D).

At identify operation 616, field data may be identified according to the heatmap and the rules. The extracted data used during the identify operation 616 represents a resource transmission request notice in an unknown (e.g., not predetermined) format. Accordingly, the identify operation 616 relies upon probability values and/or a degree of likelihood associated with regions of interest in the respective heatmaps for identifying field names for extracted data values. Flow then progresses to operation 618.

At generate operation 618, a request instruction is generated based on the identified field names and extracted data values (e.g., as were extracted as a result of performing operation 612 or operations 614-616 discussed above). For example, a request instructions for transmitting resources includes sender information, receiver information, and an amount of resources for transmission. In aspects, the generate operation 618 identifies whether a receiver information is predetermined in a receiver information database. Given the receiver information is predetermined, the generate operation 618 may retrieve receiver information from a receiver information database and use the retrieved receiver information rather than receiver information in the extracted data to generate the request instruction. Prioritizing a use of data in the receiver information database over data extracted from image data may improve accuracy in determining the receiver information. In another example, an indication as to an identified mismatch may be provided to a user, such that the user may resolve the conflict accordingly.

At transmit operation 620, the request instruction is transmitted to a transmission server (e.g., the transmission server 114 as shown in FIG. 1) to initiate a workflow to electronically executing a resource transmission from a transmission server to a receiving server. End operation 622 ends the method 600.

As should be appreciated, operations 602-622 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 6B:
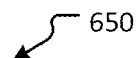
FIG. 6B illustrates an example method for training a field data extraction model in accordance with aspects of the present disclosure.
Figure 6B:
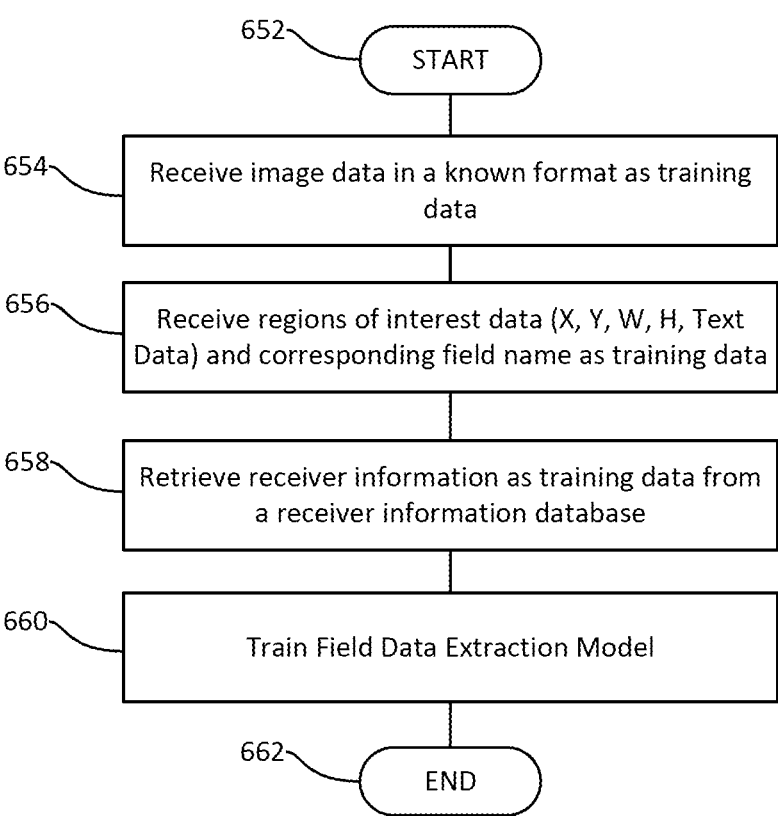

FIG. 6B illustrates an example method 650 for training a field data extraction model in accordance with aspects of the present disclosure. A general order of the operations for the method 650 is shown in FIG. 6B. Generally, the method 650 begins with start operation 652 and end with end operation 662. The method 650 may include more or fewer steps or may arrange the order of the steps differently than those shown in FIG. 6B. The method 650 can be executed as a set of computer-executable instructions executed by a cloud system and encoded or stored on a computer readable medium. Further, the method 650 can be performed by gates or circuits associated with a processor, an ASIC, an FPGA, a SOC or other hardware device. Hereinafter, the method 650 shall be explained with reference to the systems, components, devices, modules, software, data structures, data characteristic representations, signaling diagrams, methods, etc., described in conjunction with FIGS. 1, 2, 3, 4, 5A-5D, 6A and 7.

Following start operation 652, the method 650 begins with receive operation 654, which receives image data as ground truth data for training. For example, the image data may be accessed from a training data store or from a third party, among other examples. At receive regions of interest data operation 656, a set of regions of interest with corresponding field names as ground truth data is received (e.g., as may be associated with a specific instance of received image data).

At retrieve receiver information operation 658, receiver information is retrieved from a receiver information database (e.g., the receiver information database 148 as shown in FIG. 1). In practice, a commercial invoice includes a corporation or a business entity as a receiver of the resources (e.g., payee). Since business entities tend to use the same address (e.g., an address with P.O. Box) for receiving payments in a personal check, receiver information is often known and may be predetermined in the recipient information database. Accordingly, data stored in the receiver information database may be more accurate than receiver information as recognized from the image data. As such, the retrieved receiver information is used as training data.

At train operation 660, a field data extraction model is trained based on the training data. The training data includes sample image data that represents resource transmission request notices, regions of interest data, field names that correspond to the regions of interest, and receiver information retrieved from the receiver information database. Once trained, the field data extraction model may be used to determine positions and sizes of regions of interest based on image data of a resource transmission request notice (e.g., an invoice) as input. The method 650 ends with end operation 662.

As should be appreciated, operations 652-662 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 7:
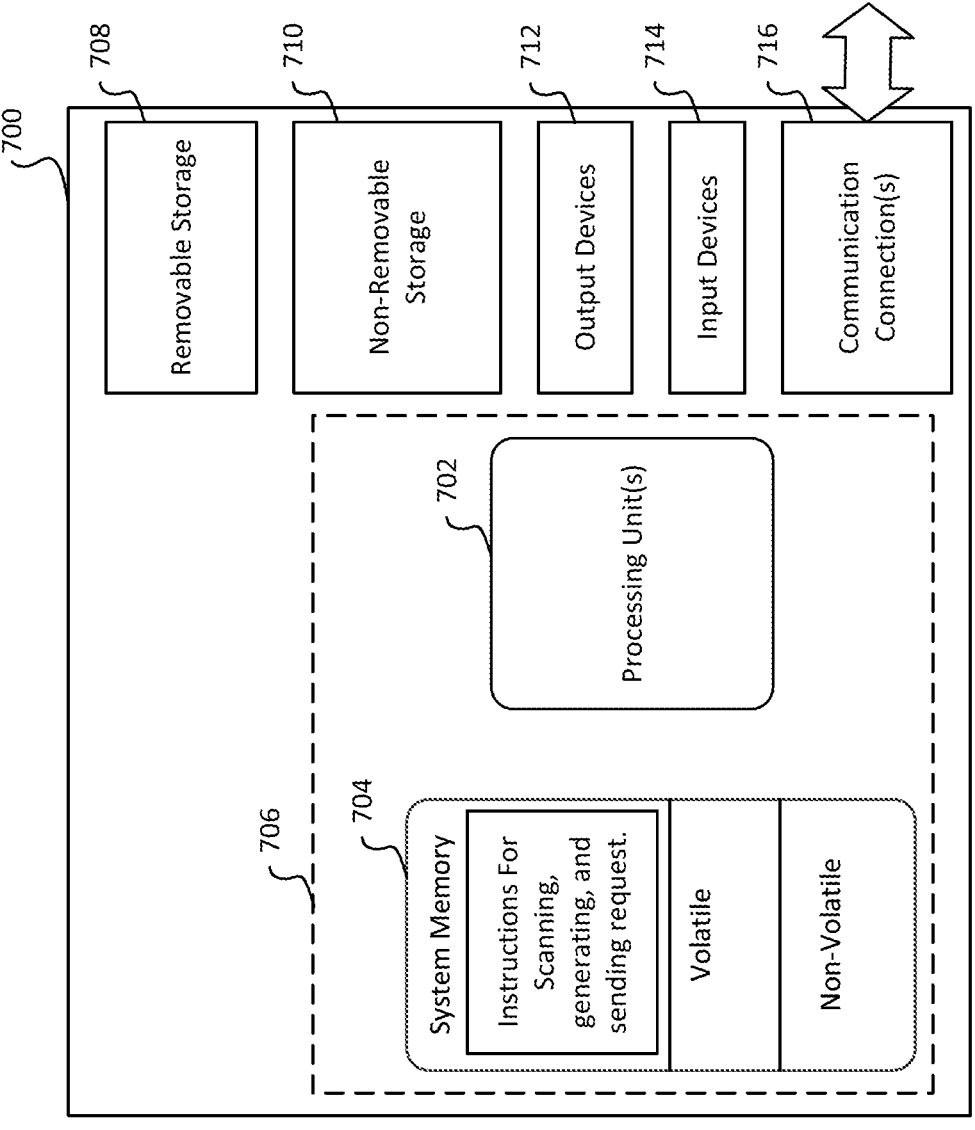
FIG. 7 illustrates a simplified block diagram of a device with which aspects of the present disclosure may be practiced in accordance with aspects of the present disclosure.

FIG. 7 illustrates a simplified block diagram of a device with which aspects of the present disclosure may be practiced in accordance with aspects of the present disclosure. The device may be a mobile computing device, for example. One or more of the present embodiments may be implemented in an operating environment 700. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smartphones, network PCs, minicomputers, mainframe computers, distributed computing environments that include any of the above systems or devices, and the like.

In its most basic configuration, the operating environment 700 typically includes at least one processing unit 702 and memory 704. Depending on the exact configuration and type of computing device, memory 704 (e.g., Instructions for generating a resource transmission request based on image data with content representing a notice of a request for resource transmission as disclosed herein) may be volatile (such as RAM), non-volatile (such as ROM, flash memory, etc.), or some combination of the two. This most basic configuration is illustrated in FIG. 7 by dashed line 706. Further, the operating environment 700 may also include storage devices (removable, 708, and/or non-removable, 710) including, but not limited to, magnetic or optical disks or tape. Similarly, the operating environment 700 may also have input device(s) 714 such as remote controller, keyboard, mouse, pen, voice input, on-board sensors, etc. and/or output device(s) 712 such as a display, speakers, printer, motors, etc. Also included in the environment may be one or more communication connections 716, such as LAN, WAN, a near-field communications network, a cellular broadband network, point to point, etc.

Operating environment 700 typically includes at least some form of computer readable media. Computer readable media can be any available media that can be accessed by the at least one processing unit 702 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media. Computer storage media does not include a carrier wave or other propagated or modulated data signal.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

The operating environment 700 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

As will be understood from the foregoing disclosure, one aspect of the technology relates to a computer implemented method. The method comprises: receiving image data, wherein the image data corresponds to a notice of a request for resource transmission in a physical form; extracting, from the image data according to a set of predetermined forms, field data associated with the request for resource transmission, wherein the extracted field data includes a recipient of the resource transmission; generating, based on the extracted field data, a request for resource transmission to the recipient; and transmitting the generated resource transmission request, thereby causing transmission of a resource to the recipient based on the extracted field data. In an example, the method further comprises: extracting a region of interest from the image data, wherein the region of interest includes textual data; matching the textual data in the region of interest with one of predetermined forms in the set of predetermined forms; assigning a data value in the textual data to a field name according to the matched one of the predetermined forms, wherein the matched one of the predetermined forms associates the field name with a location in the image data where the data value is extracted from; and generating, based at least in part on the assigned data value, the field data. In another example, the field data includes the field name and the data value assigned to the field name. In a further example, the method further comprises: obtaining a heatmap associated with the field name in the notice of a request for resource transmission; and assigning, based on the heatmap, a data value in the extracted textual data with the field name, wherein the heatmap indicates a likelihood of the data value extracted from at a region of interest corresponding to the field name. In yet another example, the method further comprises assigning, using a field data extraction model, the data value in the extracted textual data with the field name, wherein the field data extraction model, when trained, predicts a likelihood of the data value extracted from at the region of interest corresponding to the field name. In a further still example, the method further comprises assigning, using a predefined rule for identifying a data value associated with a field name, the data value in the extracted textual data with the field name, wherein the predefined rule indicates a region of the image data where the data value associated with the field name likely appears. In another example, the heatmap includes statistical data based on an aggregate of a set of the textual data corresponding to the field name and a location information of the textual data appearing in the image data. In a further example, the field name is a part of a set of field names, including: a sender name, a sender address, a receiver name, a receiver address, and an amount of resource for transmission. In yet another example, the field data extraction model includes a neural network with multiple layers of processing with co-efficient values that have been updated based on training using training data. In a further still example, the field name is a part of a set of field names including: an account number, a payer name, a payer address, a payee name, a payee address, and an amount of financial resources for remittance.

In another aspect, the technology relates to a system comprising a processor; and a memory storing computer executable instructions that when executed by the processor cause the system to perform a set of operations. The set of operations comprises: obtaining image data, wherein the image data corresponds to a notice of a request for resource transmission in a physical form; extracting, from the image data according to a set of predetermined forms, field data associated with the request for resource transmission, wherein the extracted field data includes a recipient of the resource transmission; generating, based on the extracted field data, a request for resource transmission to the recipient; and transmitting the generated resource transmission request, thereby causing transmission of a resource to the recipient based on the extracted field data. In an example, the set of operations further comprises: extracting a region of interest from the image data, wherein the region of interest includes textual data; matching the textual data in the region of interest with one of predetermined forms in the set of predetermined forms; assigning a data value in the textual data to a field name according to the matched one of the predetermined forms, wherein the matched one of the pre-determined forms associates the field name with a location in the image data where the data value is extracted from; and generating, based at least in part on the assigned data value, the field data. In another example, the field data includes a pair of the field name and the data value assigned to the field name. In a further example, the set of operations further comprises: retrieving a heatmap associated with the field name in the notice of a request for resource transmission; assigning, based on the heatmap, a data value in the extracted textual data with the field name, wherein the heatmap indicates a likelihood of the data value extracted from at a region of interest corresponding to the field name. In yet another example, the set of operations further comprises: assigning, using a field data extraction model, the data value in the extracted textual data with the field name, wherein the field data extraction model, when trained, predicts a likelihood of the data value extracted from at the region of interest corresponding to the field name. In a further still example, the set of operation further comprises: matching, based on fuzzy matching, the textual data in the region of interest with one of predetermined forms in the set of predetermined forms.

In a further aspect, the technology relates to a method, comprising: obtaining first image data, wherein the first image data represents a first notice of a request for resource transmission for training a field extraction model; obtaining a pair of a field name and a data value, wherein the field name includes sender name as ground truth data for training the field extraction model; obtaining location information of the pair in the first image data as ground truth data for training the field extraction model; obtaining receiver infor-mation associated with a resource transmission as ground truth data for training the field extraction model; generating, based on the first image data, the pair of the field name and the data value, and the receiver information, training data; training the field extraction model using the training data; receiving second image data, wherein the second image data represents a second notice of request for resource transmis-sion in a physical form; identifying, using the trained field extraction model and based on the one or more values extracted from the second image data, field data associated with the second notice of request for resource transmission; generating, based on the field data, a request for resource transmission; and initiating a workflow including executing a resource transmission according to the request for resource transmission. In an example, the field data includes a pair of the field name and the data value assigned to the field name. In another example, the field extraction model includes a neural network with multiple layers of processing with co-efficient values that have been updated based on training using the training data. In a further example, the second notice of a request for resource transmission in the physical form includes an invoice in a paper form.

What is claimed is:

1. A computer implemented method, comprising:

receiving image data, wherein the image data is representative of a notice of a request for resource transmission in a physical form;

processing the image data to determine a set of regions, wherein each region of the set of regions corresponds to a field name and comprises a subset of pixels representative of field data for the corresponding field name;

processing each determined region of the image data to extract, from the subset of pixels for the region, the field data for the field name associated with the request for resource transmission, wherein the set of regions includes a region for a recipient of the resource transmission, the processing comprising:

matching textual data extracted from image data for a region with a predetermined form in a set of predetermined forms, the matched predetermined form defining a layout for the physical form corresponding to the determined set of regions;

assigning a data value in the textual data to a field name according to the matched predetermined form, wherein the matched predetermined form associates the field name with a region in the image data where the data value is extracted from; and generating, based at least in part on the assigned data value, the field data;

generating, based on the extracted field data for each of the determined regions, a request for resource transmission to the recipient; and transmitting the generated resource transmission request, thereby causing transmission of a resource to the recipient based on the extracted field data.

2. The computer implemented method of claim 1, wherein the field data includes the field name and the data value assigned to the field name.

3. The computer implemented method of claim 1, further comprising:

obtaining a heatmap associated with the field name in the notice of a request for resource transmission; and assigning, based on the heatmap, a data value in the extracted textual data with the field name, wherein the heatmap indicates a likelihood of the data value extracted from at a region of interest corresponding to the field name.

4. The computer implemented method of claim 3, wherein the heatmap includes statistical data based on an aggregate of a set of the textual data corresponding to the field name and a location information of the textual data appearing in the image data.

5. The computer implemented method of claim 1, further comprising:

assigning, using a field data extraction model, a data value from a region of the set of regions with a corresponding field name, wherein the field data extraction model, when trained, predicts a likelihood of the data value extracted from the region corresponding to the corresponding field name.

6. The computer implemented method of claim 5, wherein the field data extraction model includes a neural network with multiple layers of processing with co-efficient values that have been updated based on training using training data.

7. The computer implemented method of claim 1, further comprising:

assigning, using a predefined rule for identifying a data value associated with a field name, a data value from a region of the set of regions with a corresponding field name, wherein the predefined rule indicates a region of the image data where the data value associated with the field name likely appears.

8. The computer implemented method of claim 1, wherein the set of regions comprises one or more of:

a region for a sender name, a region for a sender address, a region for a receiver name, a region for a receiver address, a region for an account number, a region for a payer name, a region for a payer address, a region for a payee name, a region for a payee address, a region indicating an amount of resource for transmission, and a region indicating an amount of financial resources for remittance.

9. The computer implemented method of claim 1, wherein the set of regions define a layout of a plurality of different layouts for physical forms.

10. A system, the system comprising:

a processor; and a memory storing computer executable instructions that when executed by the processor cause the system to perform a set of operations, the set of operations comprising:

obtaining image data, wherein the image data corresponds to a notice of a request for resource transmission in a physical form;

processing the image data to determine a format from a set of formats, each format defining a different layout for a physical form, the determined format indicating a set of regions for the image data that each correspond to a field name and comprise a subset of pixels representative of field data for the corresponding field name;

processing each region of the image data to extract, from the subset of pixels for the region, the field data for the field name associated with the request for resource transmission, wherein the set of regions includes a region for a recipient of the resource transmission, the processing comprising:

matching textual data extracted from image data for a region with a predetermined form in a set of predetermined forms that each correspond to a format of the set of formats;

assigning a data value in the textual data to a field name according to the matched predetermined form, wherein the matched predetermined form associates the field name with a region in the image data where the data value is extracted from; and generating, based at least in part on the assigned data value, the field data;

generating, based on the extracted field data for the set of regions, a request for resource transmission to the recipient; and transmitting the generated resource transmission request, thereby causing transmission of a resource to the recipient based on the extracted field data.

11. The system of claim 10, wherein the field data includes a pair of the field name and the data value assigned to the field name.

12. The system of claim 10, the set of operations further comprising:

retrieving a heatmap associated with the field name in the notice of a request for resource transmission;

assigning, based on the heatmap, a data value in the extracted textual data with the field name, wherein the heatmap indicates a likelihood of the data value extracted from at a region of interest corresponding to the field name.

13. The system of claim 10, the set of operations further comprising:

assigning, using a field data extraction model, a data value from a region of the set of regions with a corresponding field name, wherein the field data extraction model, when trained, predicts a likelihood of the data value extracted from the region corresponding to the corresponding field name.

14. The system of claim 10, the set of operation further comprising:

matching, based on fuzzy matching, textual data in a region with a predetermined form in the set of predetermined forms.

15. The system of claim 10, wherein the set of regions define a layout of a plurality of different layouts for physical forms.

16. A computer-implemented method, comprising:

receiving image data, wherein the image data corresponds to a notice of a request for resource transmission in a physical form;

processing the image data to determine a set of regions of the image data, wherein each region of the set of regions corresponds to a field name and comprises a subset of pixels representative of field data for the corresponding field name;

processing each determined region of the image data to extract, from the subset of pixels for the region, the field data corresponding to the field name of and associated with the request for resource transmission, the processing comprising:

matching textual data extracted from image data for a region with a predetermined form in a set of predetermined forms, the matched predetermined form defining a layout for the physical form corresponding to the determined set of regions;

assigning a data value in the textual data to a field name according to the matched predetermined form, wherein the matched predetermined form associates the field name with a region in the image data where the data value is extracted from; and generating, based at least in part on the assigned data value, the field data;

generating, based on the extracted field data from the received image data, a request instruction to perform the requested resource transmission to the recipient; and transmitting the generated resource transmission request instruction, thereby causing transmission of a resource to the recipient based on the extracted field data, wherein the extracted field data includes a recipient of the resource transmission and the field name is part of a set of field names, the set of field names further comprising at least one of:

a sender name, a sender address, a receiver name, a receiver address, or an amount of a resource for transmission.

17. The computer-implemented method of claim 16, further comprising:

assigning, using a field data extraction model, a data value from a region of the set of regions with a corresponding field name, wherein the field data extraction model, when trained, predicts a likelihood of the data value extracted from the region corresponding to the field name.

18. The computer-implemented method of claim 17, wherein the field data extraction model includes a neural network with multiple layers of processing with co-efficient values that have been updated based on training using training data.

19. The computer-implemented method of claim 16, wherein the set of field names further comprises:

an account number, a payer name, a payer address, a payee name, and a payee address.

20. The method of claim 16, wherein the set of regions define a layout of a plurality of different layouts for physical forms.

* * * * *